Patented Apr. 22, 1952

2,594,165

UNITED STATES PATENT OFFICE 2,594,165

SEMIHARD RUBBER COMPOSITION AND METHOD OF MAKING SAME

John R. Helms, Akron, Ohio, assignor to The B. F. Goodrich Company, New York, N. Y., a corporation of New York No Drawing. Application June 9, 1949, Serial No. 98,167

5 Claims. (Cl. 260—763)

This invention relates to a semi-hard rubbery composition and pertains more particularly to a semi-hard rubbery tire and the method of making it.

It is an object of my invention to provide a semi-hard rubbery tire having improved blow-out resistance.

It is also an object of my invention to provide a semi-hard rubbery composition having improved resistance to cutting and chipping.

Another object of my invention is to provide a semi-hard rubbery tire composition which has improved traction properties on smooth surfaces and which requires less power to overcome surface-tire friction when propelling machinery using tires made of such composition.

A further object of my invention is to provide a semi-hard rubbery composition possessing low hysteresis properties.

Other objects of my invention will be apparent from the description which follows.

My invention is particularly adapted for use in industrial tires as used for example on material-handling fork pallet type trucks or similar equipment where a small diameter wheel is subjected to heavy loads; such tires are of the non-pneumatic type.

Heretofore, tires used on this type of equipment have been susceptible to cutting and chipping and heat build-up causing blow-outs. Furthermore, conventional industrial tires have unsatisfactory traction properties on smooth surfaces, and consume an undesirable quantity of power in motivating industrial vehicles on such surfaces.

I have discovered an improved semi-hard rubbery composition particularly adapted for use in industrial tires having improved traction on smooth surfaces, thereby permitting industrial equipment to be motivated with relatively little power consumed. Furthermore, my invention provides a material which exhibits increased blow-out resistance, improved cutting and chipping resistance, and lower hysteresis properties as compared to known materials used for tires on such equipment.

My invention comprises a sulfur-vulcanizable elastomeric material containing two types of carbon black, semi-reinforcing furnace black and easy processing channel black, dispersed homogeneously in specified proportions throughout the elastomeric material.

Throughout the rubber industry carbon blacks have been the primary reinforcing materials incorporated in rubber or rubbery materials. The method of manufacturing carbon blacks in general involves the incomplete combustion of natural gas or oil and recovery of the particles of carbon from the gases of combustion. The carbon particles may be produced by various methods of combustion of carbonaceous material, each method imparting distinguishable properties to the carbon particles which properties are inherent in that method of combustion. Because of this phenomenon numerous types of carbon black are produced, such as semi-reinforcing furnace black and easy processing channel black, each type imparting different characteristics to the rubbery material to which it is added. It is not fully understood whether the reinforcing characteristics which carbon blacks impart to rubber or rubbery materials are due to chemical reaction and/or a physical phenomenon.

Semi-reinforcing furnace black is manufactured by the incomplete combustion of natural gas or oil in a heated furnace. The reaction of the relatively cool gas or oil in contact with the hot surfaces of the furnace and limited air supply results in the "cracking" of the hydrocarbon to substantially hydrogen gas and fine particles of carbon. The carbon particles are then filtered or washed from the gaseous combustion products. Particles of carbon produced in this manner are readily dispersed into a rubbery material, and the resulting rubbery composition is plastic, highly resilient, has low heat build-up properties, and low stiffness at high loading. Semi-reinforcing furnace black is distinguished from other types or classes of carbon black by the following properties:

| Property | Range | |
|---|---|---|
| | Min. | Max. |
| Surface area (sq. m./gm.) | 15.0 | 30.0 |
| Calculated average particle diameter (mμ) | 110.0 | 190.0 |
| pH | 8.0 | 9.5 |
| Percent volatile matter | 0.4 | 1.0 |
| Oil absorption factor | 75.0 | 100.0 |
| Percent DPG adsorption | 0.2 | 7.8 |

Easy processing channel black is generally produced by the incomplete combustion of natural gas which is ignited at the tips of small burners, and the gas stream containing the particles of carbon is directed against a channel or metal plate onto which the carbon particles adhere. Scrapers dislodge the carbon particles from the channel and the carbon black falls into hoppers and is collected. Carbon black of this type is easy processing, highly reinforcing, possesses relatively cool mixing characteristics, imparts fast curing properties to rubbery compositions, low heat-build-up properties, and high resiliency, and is specifically distinguished from other types of carbon black by the following properties:

| Property | Range | |
|---|---|---|
| | Min. | Max. |
| Surface area (sq. m./gm.) | 105.0 | 135.0 |
| Calculated average particle diameter (mμ) | 20.0 | 35.0 |
| pH | 3.5 | 5.5 |
| Percent volatile matter | 4.0 | 6.5 |
| Oil absorption factor | 105.0 | 125.0 |
| Percent DPG adsorption | 7.5 | 14.5 |

In the composition of this invention the desired properties may be obtained by dispersing into 100 parts by weight of natural rubber, such as caoutchouc and the like, 10 to 60 parts by weight of easy processing channel black, 30 to 100 parts by weight of semi-reinforcing furnace black, and 3 to 7 parts by weight of sulfur. Any of the usual fillers, softeners, accelerators, age resistors, etc., which are commonly used in the rubber industry may be employed in my composition, if desired. The most satisfactory results are obtained by dispersing into 100 parts by weight of natural rubber 20 to 40 parts by weight of easy processing channel black, 50 to 80 parts by weight of semi-reinforcing furnace black, and 3 to 7 parts by weight of sulfur.

Any accelerator generally added to rubbery compositions may be used in my invention with improvements in traction, blow-out resistance, cutting and chipping, etc. being obtained. It is preferable, however, to use from 1.0 to 1.5 parts by weight of an alkyl mercapto thiazole type accelerator, such as mixed dialkyl mercapto thiazoles, disulfide of mixed dialkyl mercapto thiazole, etc., to acquire the optimum results. A mixture of 85% by weight of 4,5-dimethyl mercapto thiazyl and 15% by weight of 4-ethyl mercapto thiazyl and a mixture of 85% by weight of bis (4,5-dimethyl thiazole) disulfide and 15% of bis (4-ethyl thiazole) disulfide are particularly satisfactory accelerators, in that they impart to vulcanized rubbery compositions excellent hysteresis properties. Any alkyl mercapto thiazole or alkyl thiazyl disulfide having from 1 to 5 carbon atoms in each alkyl group will likewise give excellent results.

An industrial rubbery tire that is subjected in use to heavy loads must be sufficiently rigid, so that it will not flow and deform from its general contour, but must not be so rigid that it is brittle and splits under the stresses normally exerted upon it. To meet this requirement a rubbery composition having a minimum durometer "A" hardness of 80 points and a maximum durometer "A" hardness of 90 points is preferably used.

Although it is preferable to use natural rubber which is essentially a rubbery polymer of isoprene as the sulfur-vulcanizable elastomeric material, synthetic rubber may also be used, such as the rubbery polymers of open-chained conjugated diolefins having from 4 to 8 carbon atoms exemplified by butadiene-1,3; 2,3-dimethyl butadiene-1,3; 1,4-dimethyl butadiene-1,3, and the like, or the copolymers of these and similar materials with each other or with such copolymerizable monomeric ethylenic materials as styrene, acrylonitrile, methyl acrylate, methyl methacrylate, ethyl acrylate, ethyl methacrylate, isobutylene, and similar materials.

It is preferable, however, if synthetic rubber is to be used to blend the synthetic rubber with at least an equal amount by weight of natural rubber since natural rubber imparts the most favorable hysteresis properties to the composition.

It is not understood why a mixture of semi-reinforcing furnace black and easy processing channel black, when dispersed in specific proportions into a rubbery composition, imparts to the vulcanized composition the properties desired, such as improved blow-out resistance, improved resistance to cutting and chipping, improved traction, etc. However, I must conclude that these properties are obtained due to the interaction of the two types of carbon blacks on the rubbery material, since, if either semi-reinforcing furnace black or easy processing channel black is used alone, the desired properties are not obtained.

Examples of compositions prepared in accordance with my invention are illustrated by the following recipes which are included merely for purposes of illustration, and are not intended to limit the scope of this invention.

Example I

A composition having the following recipe was prepared by mixing the ingredients in the usual manner on a roll mill:

| Material | Parts by weight |
|---|---|
| Natural rubber | 100.0 |
| Easy processing channel black | 25.0 |
| Semi-reinforcing furnace black | 60.0 |
| Zinc oxide | 10.0 |
| Sulfur | 5.0 |
| Softener | 2.0 |
| Antioxidant | 1.0 |
| Disulfide of a mixed dialkyl mercapto thiazole | 1.2 |
| Total | 204.2 |

The composition is vulcanized in a mold at 280° F. for a period of 150 minutes.

The vulcanized material has a durometer "A" hardness of between 80 and 90 points, a permanent set of from 5 to 10%, a Schopper rebound of from 35 to 40 points, and a temperature rise using the Goodrich Flexometer test, as described in "A. S. T. M. Standards On Rubber Products" under specification D623–41T, method A, of from 45 to 55° F.

This composition has greatly improved blow-out resistance, lower power consumption, improved traction characteristics on smooth surfaces, improved resistance to cutting and chipping, and lower hysteresis properties as compared to known industrial tire compositions.

Example II

A typical example of a composition embodying my invention using a blend of natural rubber and synthetic rubber is as follows:

| Material | Parts by weight |
|---|---|
| Natural rubber | 85.0 |
| Rubbery butadiene-styrene copolymer (GR–S) (72% conversion) | 15.0 |
| Easy processing channel black | 25.0 |
| Semi-reinforcing furnace black | 60.0 |
| Zinc oxide | 10.0 |
| Sulfur | 4.5 |
| Softener | 2.0 |
| Antioxidant | 1.0 |
| Disulfide of a mixed dialkyl mercapto thiazole | 1.2 |
| Total | 203.7 |

The composition may be mixed and vulcanized as in Example I with physical characteristics and physical tests of the same magnitude being obtained.

Example III

A typical example of a composition embodying my invention using synthetic rubber as the sulfur-vulcanizable elastomeric material is as follows:

| Material | Parts by weight |
|---|---|
| Rubbery butadiene-styrene copolymer (GR-S) (72% conversion) | 100.0 |
| Easy processing channel black | 30.0 |
| Semi-reinforcing furnace black | 55.0 |
| Sulfur | 4.0 |
| Softener | 2.5 |
| Antioxidant | 1.4 |
| Disulfide of a mixed dialkyl mercapto thiazole | 1.1 |
| Zinc oxide | 8.5 |
| Total | 202.5 |

The composition may be mixed and vulcanized as in Example I with physical characteristics and physical tests of the same magnitude being obtained.

The compositions cited in the examples above which embody my invention provide the improvements desired, such as low hysteresis properties, greater blow-out resistance, greater adhesion to smooth surfaces with lower power consumption, etc., as set out above.

It is obvious that my invention is susceptible to numerous substitutions of equivalent materials or variations in quantity of materials used without departing from the spirit and scope of my invention as defined in the appended claims.

I claim:

1. A vulcanized composition comprising 100 parts by weight of crude rubber, 20 to 40 parts by weight of easy processing channel black, 50 to 80 parts by weight of semi-reinforcing furnace black, and 1.0 to 1.5 parts by weight of an alkyl mercapto thiazole type accelerator, vulcanized in the presence of from 3 to 7 parts by weight of sulfur.

2. A vulcanized tire comprising 100 parts by weight of a vulcanized crude rubber, 20 to 40 parts by weight of easy processing channel black, 50 to 80 parts by weight of semi-reinforcing furnace black, and 1.0 to 1.5 parts by weight of an alkyl mercapto thiazole type accelerator, vulcanized in the presence of from 3 to 7 parts by weight of sulfur.

3. A vulcanized composition comprising 100 parts by weight of crude rubber, 20 to 40 parts by weight of easy processing channel black, and 50 to 80 parts by weight of semi-reinforcing furnace black, vulcanized in the presence of from 3 to 7 parts by weight of sulfur.

4. A vulcanized tire comprising 100 parts by weight of a vulcanized crude rubber, 20 to 40 parts by weight of easy processing channel black, and 50 to 80 parts by weight of semi-reinforcing furnace black, vulcanized in the presence of from 3 to 7 parts by weight of sulfur.

5. The method of making a rubbery composition comprising dispersing 20 to 40 parts by weight of easy processing channel black, 50 to 80 parts by weight of semi-reinforcing furnace black and 3 to 7 parts by weight of sulfur into 100 parts by weight of crude rubber and vulcanizing the composition to a semi-hard elastomeric material.

JOHN R. HELMS.

REFERENCES CITED

The following references are of record in the file of this patent:

UNITED STATES PATENTS

| Number | Name | Date |
|---|---|---|
| 1,930,437 | Beaver | Oct. 10, 1933 |
| 2,449,461 | Elliott et al. | Sept. 14, 1948 |

OTHER REFERENCES

India Rubber World, vol. 107 of January 1943, pages 365–368.